United States Patent [19]

Greaves et al.

[11] 3,723,403

[45] Mar. 27, 1973

[54] OLEFINE POLYMERIZATION AT HIGH PRESSURES USING A DISPERSED ZIEGLER-TYPE CATALYST

[75] Inventors: Jeffrey Chester Greaves; William George Oakes, both of Welwyn Garden City, England

[73] Assignee: Imperial Chemical Indusries Limited, London, England

[22] Filed: Oct. 30, 1969

[21] Appl. No.: 872,742

Related U.S. Application Data

[63] Continuation-in-part of Ser. No. 728,347, May 9, 1968, abandoned.

[30] Foreign Application Priority Data

Oct. 30, 1968 Great Britain.....................51,471/68
Nov. 8, 1968 Great Britain.....................53,064/68

[52] U.S. Cl. ......260/94.9 B, 260/88.2 R, 260/94.9 P
[51] Int. Cl. ..............................C08f 3/04, C08f 1/42
[58] Field of Search .....................260/94.9 B, 94.9 P

[56] References Cited
UNITED STATES PATENTS

2,936,302   5/1960   Jones et al.................260/94.9 C UX
3,067,183   12/1962  Hagenmeyer et al. .......260/94.9 B X

FOREIGN PATENTS OR APPLICATIONS

832,505   4/1960   Great Britain
932,231   7/1963   Great Britain
979,123   1/1965   Great Britain
932,231   7/1963   Great Britain Primary Examiner—James A. Seidleck
Assistant Examiner—A. Holler
Attorney—Cushman, Darby & Cushman

[57] ABSTRACT

Ethylene is polymerized at high temperature and high pressure using a finely divided Ziegler catalyst comprising an organo-aluminium compound and a titanium trihalide which has been finely divided by pretreatment with an $\alpha$olefine or mixture thereof under conditions to form an amorphous polymer. The titanium trihalide can be titanium trichloride which has been prepared by the reduction of titanium tetrachloride with hydrogen, aluminum, or, preferably, an organo-aluminium compound.

12 Claims, No Drawings

OLEFINE POLYMERIZATION AT HIGH PRESSURES USING A DISPERSED ZIEGLER-TYPE CATALYST

This is a continuation-in-part of our copending Application Ser. No. 728,347, filed 9th May, 1968, now abandoned.

This invention relates to the polymerization of ethylene.

Ethylene may be polymerized by one of two different methods, both of which are used industrially on a large scale.

In the first process, ethylene is polymerized under conditions of high temperature and high pressure, for example, in excess of 125°C and above 500 atmospheres, and typically 140°C–300°C and 1000–3000 atmospheres or greater. The polymerization is effected in the presence of a compound capable of producing free radicals, typically a peroxygen compound which compound acts as a polymerization initiator, and this process results in the formation of a branched chain polyethylene product. This procedure is frequently referred to as the "high-pressure" process.

Subsequent to the development of the high pressure process, it was found possible to polymerize ethylene under conditions of low temperature, for example below 100°C and commonly in the range 50°C to 80°C, and low pressure, for example 10 atmospheres and even as low as atmospheric pressure. The catalysts used in this later process are complex organo-metallic compounds which are sometimes termed "Ziegler" catalysts. The expression "Ziegler catalyst" is used to describe a combination of a compound of a transition metal of sub-group IVa to VIa of the Periodic Table with an organo-metallic compound of a metal of groups I to III of the Periodic Table. A widely used Ziegler catalyst system is based on a titanium compound, for example titanium tetrachloride or titanium trichloride, together with an aluminum compound, for example aluminum triethyl or aluminum diethyl chloride. The product of the Ziegler or "low pressure" process is a linear polyethylene which shows little chain branching and which has a melting point of about 130°C compared to melting points in the range 110°–115°C for typical high pressure polyethylenes. Furthermore, the density of low pressure polyethylene is generally higher than the density of high pressure polyethylene, typical values being above 0.95, commonly about 0.96 for low pressure polyethylene and below 0.935 for high pressure polyethylene.

British Pat. No. 828,828 discloses the polymerization of olefines, particularly ethylene, at a temperature of at least 175°C and a pressure of at least 500 atmospheres using a catalyst of the Ziegler type, but the density of the polyethylene product thereby obtained in no case exceeds 0.95, and such a process has not been developed on a commercial basis.

According to the present invention there is provided a process for the polymerization of ethylene wherein ethylene is polymerized at a temperature not less than 125°C and a pressure not less than 500 atmospheres, typically in the range 140°–300°C and 1000–3000 atmospheres using a Ziegler type catalyst, said catalyst being a combination of an organo-aluminum activator and a trivalent titanium component, wherein said trivalent titanium component has been finely dispersed by using the said trivalent titanium component, either alone or in the presence of the organo-aluminum activator, as a catalyst for the production of a minor proportion of an amorphous polymer (as hereinafter defined).

It is preferred, but not essential, that when polymerizing the ethylene the conditions of temperature and pressure used are such that the polymerization reaction mixture forms a single fluid phase and remains thus until removed from the reaction zone or until the polymerization is terminated. The indications whether or not the polymerization is proceeding in a single fluid phase will be readily recognized by those skilled in the art, or will be apparent from the data given in "Fluid Phase Equilibria in the System Polyethylene - Ethylene", I and II, *Rec. Trav. Chim.* 84 261 (1965) (by Swelheim, de Swaan Arons and Diepen), and 85, 504 to 516 (1966) (by Koningsveld, Diepen and Chermin). The pressure at which a single fluid phase is produced is somewhat higher for linear polyethylenes than for the branched polyethylenes used in the measurements in the papers of Diepen et al. and typically would be 100–200 atmospheres higher for the same temperature and concentration. The single phase-two phase boundary is also influenced by the polymer molecular weight, being at higher pressures for the higher molecular weight polymers. The minimum pressure and minimum temperature at which the reaction will proceed in a single fluid phase are interdependent. Thus, to produce a homopolymer at a temperature of 140°C, a pressure above 1800 atmospheres will be required, while at higher temperatures a lower pressure may be used, for example 200°C and 1500 atmospheres, to give a single fluid phase. It is, however, usually desirable to select reaction conditions appreciably above the minimum necessary, in order to ensure that single phase conditions are maintained when parameters such as molecular weight or polymer concentration vary.

We have found that the use of pressures and temperatures below those at which the reaction takes place in a single fluid phase results in non-uniformity of the product. Separation into two phases may delay removal of the product from the reaction zone, allowing cross-linking or degradation to occur.

The polymerization is preferably conducted at a temperature between 160°C and 260°C. It is preferred at such temperatures to operate under a pressure of at least 1400 atmospheres to ensure that the reaction proceeds in a single fluid phase.

As in conventional high pressure ethylene polymerization processes, the temperature and pressure to be used are predetermined from experience and by experiment to give a product having the desired balance of properties. In a continuous process the reaction pressure is controlled at the predetermined level, and the rate of injection of the catalyst is controlled so as to maintain reaction at the predetermined temperature.

The polyethylene product obtained by the process of the invention contains only small quantities of catalyst residues as will be discussed in more detail hereafter. Furthermore, the polyethylene commonly has a density in excess of 0.955 gms/cc, a narrow molecular weight distribution and a high elongation to break. The narrow molecular weight distribution may be indicated in a number of different ways, one commonly accepted method for determining a narrow molecular weight distribution being by a determination of the ratio $M_w/M_n$, where $M_w$ is the weight average molecular weight, and $M_n$ is the number average molecular weight. Another method which may be used to indicate a narrow molecular weight distribution is gel permeation chromatography. Alternatively, a narrow molecular weight distribution can be inferred by the determination of a property which is dependent on the molecular weight distribution, such a property being the stress exponent of melt viscosity, which increases as the molecular weight distribution becomes broader. We have found that many polymers made in accordance with the present invention have a ratio $M_w/M_n$ of 4.0 or less, indicating a narrow molecular weight distribution. An advantage of a narrow molecular weight distribution for polyethylene is that it provides a good mechanical strength and a resistance to environmental stress cracking.

It will be appreciated that the process of the present invention can be carried out as a batch operation but it is preferred to effect the polymerization on a continuous basis. When operating on a continuous basis, the process may be carried out in a continuous stirred reactor or a continuous tubular reactor. The process may be carried out as a single zone process using a single reactor, but it is preferred to use either a number of reactors in series or a single reactor which is effectively divided internally into several zones to give a multi-zone process. Under the reaction conditions employed, the catalyst is active for only a short time of the order of several seconds, for example 10 seconds, and thus in a multi-zone process it will normally be necessary to introduce the catalyst into more than one zone. The polymer formed in the reactor or reactors may be separated from the unreacted ethylene and processed in the normal high pressure fashion without removal of the catalyst residues, which is an expensive and time-consuming process in conventional processes using Ziegler catalysts at low pressure. The unreacted ethylene is mixed with a quantity of fresh ethylene, repressurized and recycled to the reactor.

The catalyst is introduced by injecting it as a fine dispersion in a suitable inert liquid directly into the reactor. Suitable liquids include, for example, white spirit, hydrocarbon oils, pentane, hexane, heptane, iso-octane, toluene, higher branched saturated aliphatic hydrocarbons and mixtures of such liquids, for example a mixture of branched saturated aliphatic hydrocarbons having a boiling point in the range 168°–187°C. The dispersion is kept out of contact with water and air, preferably under a nitrogen blanket, before its introduction into the reactor and the ethylene also should be essentially free of water and oxygen.

The production of the trivalent titanium component as a fine dispersion by using the said component, either alone or together with the organo-aluminum compound, as a catalyst for the production of a minor proportion of an amorphous polymer will, for convenience, hereafter be referred to as the "catalyst pretreatment" or simply "pretreatment" and, as is set out in more detail hereafter, a large number of different catalyst pretreatments may be used. The trivalent titanium component is preferably titanium trichloride (as hereafter defined) and the pretreatment steps enumerated below are described in respect of the use of titanium trichloride.

1. To titanium trichloride there is added an organo-aluminum activator such as an aluminum alkyl or preferably an aluminum halogenalkyl. The polymerization catalyst thus produced is then used to polymerize an unbranched α-olefine containing at least 5 carbon atoms, advantageously pentene-(1), hexene-(1), heptene-(1), octene-(1), or another such olefine within the range from hexene-(1) to hexadecene-(1), the polymerization being effected either in the undiluted α-olefines themselves or in their solutions in an oxygen- sulphur- and olefine-free organic media, for example an aromatic, aliphatic or cyclo-aliphatic hydrocarbon. It is advantageous to choose the proportion of trivalent titanium to α-olefine contained in the polymerization catalyst in a manner such that for each trivalent titanium atom, 3 to 20 α-olefine molecules are present. Preferably the polymerization of the specified unbranched α-olefines is effected at temperatures of 60°C and below, for example 50°C and even room temperature. The catalyst thus obtained is dispersed in a finely divided, virtually colloidal, form and substantially all the particles have a diameter not exceeding 5 microns and in many cases less than 1 micron.

2. As in pretreatment procedure (1), an organo-aluminum activator is added to the titanium trichloride. This catalyst system is then used to polymerize an α-olefine selected from ethylene, propylene and butene-1 at a temperature of at least 60°C. For ethylene and propylene a temperature of at least 100°C should be used, while for butene-1 dispersion may be obtained at a temperature of about 60°C but to obtain the desired amount of dispersion a temperature of 80°C, or above, should be used, the temperature used for the pretreatment being dependent primarily on the α-olefine being polymerized. The amount of α-olefine used should be sufficient to fracture the catalyst and a convenient amount is 6–10 moles of α-olefine per mole of trivalent titanium. Preferably this pretreatment is effected in an inert diluent.

3. This is similar to pretreatment (2) in that it involves the pretreatment of the titanium trichloride and organo-aluminum activator with an α-olefine at elevated temperature. In this case the α-olefines are the branched chain α-olefines such as, for example, 3-methyl butene-1, 3-methyl pentene-1, 4-methyl pentene-1 etc. The polymerization conditions used are such that these α-olefines are polymerized to give an amorphous polymer. The polymerization temperature used should be at least 100°C.

4. This is similar to pretreatment (1) in that the pretreatment involves the use of both the titanium trichloride and the organo-aluminum activator. In this pretreatment a mixture of α-olefins is copolymerized to give an amorphous copolymer in which the monomer constituents are randomly distributed within the polymer chain. The temperature of the pretreatment may conveniently be in the range 20°C to 100°C, and in general a temperature of about 60°C will be satisfactory. Suitable monomer mixtures for the pretreatment include, for example, ethylene/propylene, ethylene/butene-1 and propylene/butene-1. Mixtures of the linear α-olefines of pretreatment (1) can also be used. Depending on the mixture of monomers used, up to 100 moles, or more, of the mixture of monomers can be polymerized per mole of titanium trichloride.

5. In this pretreatment the titanium trichloride is used as a polymerization catalyst in the substantial absence of added organo-aluminum activator. The absence of added organo-aluminum activator does not preclude the presence of small amounts of activator which may be present in the titanium component as a result of its method of preparation. The α-olefine used in the pretreatment is at least one α-olefine of from 2 to 16 carbon atoms preferably an unbranched α-olefine of at least 5 carbon atoms such as hexene-1.

In the various pretreatments, the amount of monomer used will vary in dependence on the monomer, catalyst, temperature and pretreatment technique being used, but in general up to 20 moles of monomer (or mixture of monomers) is sufficient to provide a finely dispersed catalyst.

The formation of the catalyst as a fine dispersion makes it particularly suitable for continuous operation and continuous injection into the reactor since the fine particles can be pumped using a high pressure pump which would be damaged by the use of coarse particles.

The term "amorphous polymer" is used herein to include polymers which, under the polymerization conditions used, are swollen by the diluent and cause fracturing of the catalyst particles. Under the conditions of pretreatments 2 and 3 the polymers formed are swollen by the polymerization diluent and cause fracturing of the catalyst particles, whereas under conventional polymerization conditions monomers such as ethylene, propylene, etc. form crystalline polymers and do not cause breakdown of the catalyst particles.

The term "titanium trichloride" is used herein in the manner commonly used in the art to include not only pure titanium trichloride, but also compositions in which titanium trichloride is co-crystallized with an aluminum compound such as aluminum trichloride.

A. Pure titanium trichloride may be obtained as the product obtained by heating a mixture of $TiCl_4$ vapor and hydrogen.

B. A product sold commercially and referred to as titanium trichloride is made by the reduction of $TiCl_4$ with metallic aluminum and is actually co-crystallized $3TiCl_3 \cdot alCl_3$ having the empirical formula $AlTi_3Cl_{12}$. This material may be prepared by adding metallic aluminum and aluminum trichloride to $TiCl_4$ being heated under reflux and then separating the co-crystallized product from the excess unreacted $TiCl_4$, for example by distillation at low pressure as described in British Pat. No. 877,050. The product should be ground before use as a catalyst, for example in a dry ball-mill. Alternatively, the co-crystalline product may be obtained by ball-milling an excess of titanium tetrachloride with metallic aluminum for example at temperatures up to 200°C.

C. A particularly preferred method of preparing titanium trichloride is by reacting titanium tetrachloride with organo-aluminum compound, such as aluminum alkyls or aluminum halogen alkyls, for example aluminumtriisobutyl, aluminumdiisobutyl monohydride, aluminummonoethyldichloride, aluminumdiethyl monofluoride, and preferably aluminumdiethyl monochloride or aluminumethyl sesquichloride. The titanium tetrachloride and the organo-aluminum compound are reacted at a temperature in the range from −100°C to +100°C, and advantageously from −20°C to +40°C, the ratio of aluminum to titanium being 0.1 to 4.0 and preferably 0.3 to 2.0. The brownish red trivalent titanium precipitate thus obtained can be heated at once for 1 to 5 hours at 60° to 120°C, or the precipitate can be washed with an inert organic medium such as that in which the reduction of the tetravalent titanium to the trivalent titanium has taken place, and then heated. The precipitated titanium trichloride component may be heated more than once if this is desired. Care must be taken that all the operations are carried out with the exclusion of oxygen and moisture. The titanium trichloride component thus obtained contains aluminum chloride and will normally also include an organo-aluminum halide, and may be in the form of $\beta$-$TiCl_3$ or the purple-red crystalline form of $TiCl_3$.

We have found that the various pretreatment techniques described are not equally effective and that not all the catalysts are as readily dispersed.

The preferred catalyst, (catalyst type C), is generally more readily dispersed than the other two catalysts (catalysts A and B) and of these, the catalysts of type B can be dispersed somewhat more readily. Of the various dispersion techniques we have found technique (1) to be particularly effective. Technique (5) is useful since it provides a dispersed catalyst without the use of added activators, and such dispersed catalysts can be used as stock solutions which can be diluted down for use with a variety of different organo-aluminum activators.

While the foregoing has been in respect of titanium trichloride and its preparation, it will be appreciated that other trivalent titanium compounds, particularly the halides, may be used, and in some cases prepared, in a like manner.

The Ziegler catalyst is highly active and with such a catalyst it is possible to obtain a conversion at equilibrium of 40,000 or more moles of ethylene per mole of titanium trichloride. Furthermore using this catalyst, equilibrium conditions, at about 10 percent conversion of ethylene monomer to polymer, are attained quickly, for example in about 2 minutes. At these conversion levels, the final polymer contains less than 500 parts per million by weight of total catalyst residues (equivalent to about 50 p.p.m. of titanium) and it is unnecessary to treat the polymer to remove these residues.

Chain transfer agents may, if desired, be used in the reaction, and will usually be required to lower the molecular weight and hence raise the melt flow index of the product. In the absence of chain transfer agents, the catalyst gives a polymer of high molecular weight and low melt flow index which is difficult to handle. Chain transfer agents suitable for use in conjunction with the catalyst include, for example, hydrogen. It will be appreciated that the catalyst system can give rise to lower or higher molecular weight products depending on the reaction conditions. With the catalyst used, high temperature, and high pressure affect the molecular weight of the polymer. The precise effect of particular conditions can be determined only by experiment. The process of the invention may be applied to the production of copolymers of ethylene with minor proportions of other monomers, for example 10% of propylene, butene-1 etc.

Into the ethylene polymers and copolymers produced in accordance with this invention can be blended, as desired, various additives such as antioxidants, U.V. stabilizers sulphur compounds, phosphorus compounds, dyes, pigments, fillers, antistatic agents, flame retardants and antacids.

It will be appreciated that the process of this invention should be carried out in the absence, or substantial absence, of any compounds which are capable of producing free radicals.

Many variations of catalyst preparation and proportions, and polymerization conditions are possible within the scope of this invention and the following examples are illustrative, but not limiting, of the invention.

EXAMPLES 1–5

The titanium trichloride catalyst component was prepared by reaction of $TiCl_4$ and aluminum ethyl sesquichloride in a purified hydrocarbon fraction comprising a mixture of branched saturated aliphatic hydrocarbons having a boiling point in the range 170°–190°C. A solution of the sesquichloride in this diluent was added gradually drop by drop, with stirring, to a solution of $TiCl_4$ in the same diluent over a period of several hours, the temperature being held at 0°C. The molar ratio of total aluminum to titanium was approximately 1.6. The resulting slurry containing $TiCl_3$ was subsequently heated for a period at 95°C. The $TiCl_3$ was then washed several times with fresh quantities of the diluent. To a slurry of the titanium trichloride precipitate was added aluminum diethyl chloride in a molar proportion of aluminum to titanium of 2:1. This system was then used to polymerize 16 moles of hexene-1 per mole of titanium at 50°C to give a finely dispersed catalyst which was used for the polymerization of ethylene.

Ethylene was polymerized in a continuous stirred autoclave reactor using the reaction conditions indicated in Table 1. The ethylene contained hydrogen in an amount of about 2 moles percent based on the ethylene to control the molecular weight of the polymer. The concentration of the catalyst slurry and the rate of introduction of the catalyst into the reactor are also indicated. The slurry of hexene-1 treated catalyst was diluted prior to its introduction into the reactor, the dilution in Examples 1–4 being with further quantities of the hydrocarbon fraction used in the catalyst preparation, while in Example 5 dilution was effected with iso-octane.

The melt flow index (M.F.I.) of the polymer was measured using the method of ASTM Method 1238–62T using a 2.16 Kgm weight at 190°C. The density and tensile measurements were carried out on compression mouldings which had been annealed for one hour at 100°C. The density was measured using a density gradient column. The tensile properties were determined using specimens formed using a cutter of the type specified in B.S. 903 Part A2 using an effective gauge length of 0.75 inch (instead of one inch). The tests were performed using a draw rate of 400% per minute.

TABLE 1

| Example | Pressure (kgm./cm.$^2$) | Temperature (°C.) | Average dwell time (secs.) | Catalyst concentration (moles/l.) | Catalyst in gas (moles p.p.m.) | Ethylene conversion to polymer (percent) | M.F.I. | Yield stress (p.s.i.) | Break stress (p.s.i.) | Elongation to break (percent) | Density (gm./cc.) | Conversion (moles polymer per mole $TiCl_3$) | Stress exponent | $M_N$ (×10$^{-4}$) | $M_W$ (×10$^{-4}$) | $M_W/M_N$ |
|---|---|---|---|---|---|---|---|---|---|---|---|---|---|---|---|---|
| 1 | 1,950 | 180 | 118 | 0.005 | 1.9 | 0.0 | 1.7 | 4,420 | 3,130 | 990 | 0.964 | 47,500 | 1.47 | --- | --- | --- |
| 2 | 2,000 | 180 | 77 | 0.005 | 1.8 | 7.7 | 6.6 | 4,840 | 3,470 | 150 | 0.958 | 42,500 | 1.29 | 2.65 | 10.6 | 4.0 |
| 3 | 2,000 | 200 | 74 | 0.008 | 3.1 | 13.9 | 5.5 | 4,450 | 2,570 | 180 | 0.956 | 45,000 | 1.34 | 1.92 | 8.19 | 4.26 |
| 4 | 2,000 | 220 | 82 | 0.002 | 4.0 | 12.4 | 6.1 | --- | --- | --- | 0.968 | 31,100 | 1.49 | 2.41 | 5.07 | 2.11 |
| 5 | 2,000 | 180 | 92 | 0.005 | 3.2 | 7.9 | 0.33 | 4,170 | 5,580 | 1,220 | 0.956 | 24,400 | 1.67 | 4.38 | 13.5 | 3.08 |

α-olefines of pretreatment (1) can also be used. Depending on the mixture of monomers used, up to 100 moles, or more, of the mixture of monomers can be polymerized per mole of titanium trichloride.

5. In this pretreatment the titanium trichloride is used as a polymerization catalyst in the substantial absence of added organo-aluminum activator. The absence of added organo-aluminum activator does not preclude the presence of small amounts of activator which may be present in the titanium component as a result of its method of preparation. The α-olefine used in the pretreatment is at least one α-olefine of from 2 to 16 carbon atoms preferably an unbranched α-olefine of at least 5 carbon atoms such as hexene-1.

In the various pretreatments, the amount of monomer used will vary in dependence on the monomer, catalyst, temperature and pretreatment technique being used, but in general up to 20 moles of monomer (or mixture of monomers) is sufficient to provide a finely dispersed catalyst.

The formation of the catalyst as a fine dispersion makes it particularly suitable for continuous operation and continuous injection into the reactor since the fine particles can be pumped using a high pressure pump which would be damaged by the use of coarse particles.

The term "amorphous polymer" is used herein to include polymers which, under the polymerization conditions used, are swollen by the diluent and cause fracturing of the catalyst particles. Under the conditions of pretreatments 2 and 3 the polymers formed are swollen by the polymerization diluent and cause fracturing of the catalyst particles, whereas under conventional polymerization conditions monomers such as ethylene, propylene, etc. form crystalline polymers and do not cause breakdown of the catalyst particles.

The term "titanium trichloride" is used herein in the manner commonly used in the art to include not only pure titanium trichloride, but also compositions in which titanium trichloride is co-crystallized with an aluminum compound such as aluminum trichloride.

A. Pure titanium trichloride may be obtained as the product obtained by heating a mixture of $TiCl_4$ vapor and hydrogen.

B. A product sold commercially and referred to as titanium trichloride is made by the reduction of $TiCl_4$ with metallic aluminum and is actually co-crystallized $3TiCl_3alCl_3$ having the empirical formula $AlTi_3Cl_{12}$. This material may be prepared by adding metallic aluminum and aluminum trichloride to $TiCl_4$ being heated under reflux and then separating the co-crystallized product from the excess unreacted $TiCl_4$, for example by distillation at low pressure as described in British Pat. No. 877,050. The product should be ground before use as a catalyst, for example in a dry ball-mill. Alternatively, the co-crystalline product may be obtained by ball-milling an excess of titanium tetrachloride with metallic aluminum for example at temperatures up to 200°C.

C. A particularly preferred method of preparing titanium trichloride is by reacting titanium tetrachloride with organo-aluminum compound, such as aluminum alkyls or aluminum halogen alkyls, for example aluminumtriisobutyl, aluminumdiisobutyl monohydride, aluminummonoethyldichloride, aluminumdiethyl monofluoride, and preferably aluminumdiethyl monochloride or aluminumethyl sesquichloride. The titanium tetrachloride and the organo-aluminum compound are reacted at a temperature in the range from −100°C to +100°C, and advantageously from −20°C to +40°C, the ratio of aluminum to titanium being 0.1 to 4.0 and preferably 0.3 to 2.0. The brownish red trivalent titanium precipitate thus obtained can be heated at once for 1 to 5 hours at 60° to 120°C, or the precipitate can be washed with an inert organic medium such as that in which the reduction of the tetravalent titanium to the trivalent titanium has taken place, and then heated. The precipitated titanium trichloride component may be heated more than once if this is desired. Care must be taken that all the operations are carried out with the exclusion of oxygen and moisture. The titanium trichloride component thus obtained contains aluminum chloride and will normally also include an organo-aluminum halide, and may be in the form of $\beta$-$TiCl_3$ or the purple-red crystalline form of $TiCl_3$.

We have found that the various pretreatment techniques described are not equally effective and that not all the catalysts are as readily dispersed.

The preferred catalyst, (catalyst type C), is generally more readily dispersed than the other two catalysts (catalysts A and B) and of these, the catalysts of type B can be dispersed somewhat more readily. Of the various dispersion techniques we have found technique (1) to be particularly effective. Technique (5) is useful since it provides a dispersed catalyst without the use of added activators, and such dispersed catalysts can be used as stock solutions which can be diluted down for use with a variety of different organo-aluminum activators.

While the foregoing has been in respect of titanium trichloride and its preparation, it will be appreciated that other trivalent titanium compounds, particularly the halides, may be used, and in some cases prepared, in a like manner.

The Ziegler catalyst is highly active and with such a catalyst it is possible to obtain a conversion at equilibrium of 40,000 or more moles of ethylene per mole of titanium trichloride. Furthermore using this catalyst, equilibrium conditions, at about 10 percent conversion of ethylene monomer to polymer, are attained quickly, for example in about 2 minutes. At these conversion levels, the final polymer contains less than 500 parts per million by weight of total catalyst residues (equivalent to about 50 p.p.m. of titanium) and it is unnecessary to treat the polymer to remove these residues.

Chain transfer agents may, if desired, be used in the reaction, and will usually be required to lower the molecular weight and hence raise the melt flow index of the product. In the absence of chain transfer agents, the catalyst gives a polymer of high molecular weight and low melt flow index which is difficult to handle. Chain transfer agents suitable for use in conjunction with the catalyst include, for example, hydrogen. It will be appreciated that the catalyst system can give rise to lower or higher molecular weight products depending on the reaction conditions. With the catalyst used, high temperature, and high pressure affect the molecular weight of the polymer. The precise effect of particular conditions can be determined only by experiment. The process of the invention may be applied to the production of copolymers of ethylene with minor proportions of other monomers, for example 10% of propylene, butene-1 etc.

Into the ethylene polymers and copolymers produced in accordance with this invention can be blended, as desired, various additives such as antioxidants, U.V. stabilizers sulphur compounds, phosphorus compounds, dyes, pigments, fillers, antistatic agents, flame retardants and antacids.

It will be appreciated that the process of this invention should be carried out in the absence, or substantial absence, of any compounds which are capable of producing free radicals.

Many variations of catalyst preparation and proportions, and polymerization conditions are possible within the scope of this invention and the following examples are illustrative, but not limiting, of the invention.

EXAMPLES 1–5

The titanium trichloride catalyst component was prepared by reaction of $TiCl_4$ and aluminum ethyl sesquichloride in a purified hydrocarbon fraction comprising a mixture of branched saturated aliphatic hydrocarbons having a boiling point in the range 170°–190°C. A solution of the sesquichloride in this diluent was added gradually drop by drop, with stirring, to a solution of $TiCl_4$ in the same diluent over a period of several hours, the temperature being held at 0°C. The molar ratio of total aluminum to titanium was approximately 1.6. The resulting slurry containing $TiCl_3$ was subsequently heated for a period at 95°C. The $TiCl_3$ was then washed several times with fresh quantities of the diluent. To a slurry of the titanium trichloride precipitate was added aluminum diethyl chloride in a molar proportion of aluminum to titanium of 2:1. This system was then used to polymerize 16 moles of hexene-1 per mole of titanium at 50°C to give a finely dispersed catalyst which was used for the polymerization of ethylene.

Ethylene was polymerized in a continuous stirred autoclave reactor using the reaction conditions indicated in Table 1. The ethylene contained hydrogen in an amount of about 2 moles percent based on the ethylene to control the molecular weight of the polymer. The concentration of the catalyst slurry and the rate of introduction of the catalyst into the reactor are also indicated. The slurry of hexene-1 treated catalyst was diluted prior to its introduction into the reactor, the dilution in Examples 1–4 being with further quantities of the hydrocarbon fraction used in the catalyst preparation, while in Example 5 dilution was effected with iso-octane.

The melt flow index (M.F.I.) of the polymer was measured using the method of ASTM Method 1238–62T using a 2.16 Kgm weight at 190°C. The density and tensile measurements were carried out on compression mouldings which had been annealed for one hour at 100°C. The density was measured using a density gradient column. The tensile properties were determined using specimens formed using a cutter of the type specified in B.S. 903 Part A2 using an effective gauge length of 0.75 inch (instead of one inch). The tests were performed using a draw rate of 400% per minute.

TABLE 1

| Example | Pressure (kgm./cm.²) | Temperature (°C.) | Average dwell time (secs.) | Catalyst concentration (moles/l.) | Catalyst in gas (moles p.p.m.) | Ethylene conversion to polymer (percent) | M.F.I. | Yield stress (p.s.i.) | Break stress (p.s.i.) | Elongation to break (percent) | Density (gm./cc.) | Conversion (moles polymer per mole $TiCl_3$) | Stress exponent | $M_N$ (×10⁻⁴) | $M_W$ (×10⁻⁴) | $M_W/M_N$ |
|---|---|---|---|---|---|---|---|---|---|---|---|---|---|---|---|---|
| 1 | 1,050 | 180 | 118 | 0.005 | 1.9 | 9.0 | 1.7 | 4,420 | 3,130 | 990 | 0.964 | 47,500 | 1.47 | — | — | — |
| 2 | 2,000 | 180 | 77 | 0.005 | 1.8 | 7.7 | 6.6 | 4,840 | 3,470 | 150 | 0.958 | 42,500 | 1.29 | 2.65 | 10.6 | 4.0 |
| 3 | 2,000 | 200 | 74 | 0.008 | 3.1 | 13.9 | 5.5 | 4,450 | 2,570 | 180 | 0.956 | 45,000 | 1.34 | 1.92 | 8.19 | 4.26 |
| 4 | 2,000 | 220 | 82 | 0.002 | 4.0 | 12.4 | 6.1 | — | — | — | 0.968 | 31,100 | 1.49 | 2.41 | 5.07 | 2.11 |
| 5 | 2,000 | 180 | 92 | 0.005 | 3.2 | 7.9 | 0.33 | 4,170 | 5,580 | 1,220 | 0.956 | 24,400 | 1.67 | 4.38 | 13.5 | 3.08 |

The stress exponent is defined by the following ratio:- Stress exponent = (Log $MFI_5$ − Log $MFI_{2.16}$/Log 5 − Log 2.16)

$MFI_5$ and $MFI_{2.16}$ are the melt flow indices measured using weights of 5 Kgms and 2.16 Kgms respectively, at a temperature of 190°C.

The number average molecular weight ($M_n$) is determined by osmometry.

The weight average molecular weight ($M_{90}$) is measured by light scattering techniques (dissymmetry correction of 90° scatter).

EXAMPLE 6

Preparation and dispersion of β-$TiCl_3$

The catalyst used in Examples 1 – 5 was a purple crystalline form of titanium trichloride.

Into a vacuum purged reaction vessel was introduced 55 mls (500 m moles) of titanium tetrachloride and 100 mls of the same diluent as used in the catalyst preparation in Example 1 – 5. The solution was cooled to 0°C and 600 mls of a 0.75 molar solution of di-isobutyl aluminum chloride in the same diluent was slowly added over a period of six hours. The mixture was stirred overnight and allowed to warm up to room temperature (15° to 20°C). The temperature was then raised to 100°C, and this temperature was maintained for four hours. The catalyst was then washed repeatedly with cold diluent until the washings were substantially free from chloride as detected by aqueous silver nitrate.

The catalyst had the approximate formula:

$TiCl_3$; 0.115 $iBuAlCl_2$; 0.17 $AlCl_3$.

X-ray examination showed only the presence of the β-form of $TiCl_3$.

This titanium trichloride material was then dispersed by slowly adding 19 mls (about 100 m moles) of decene-1 to a stirred suspension of 25 m moles of the β-$TiCl_3$ in 225 mls of the hydrocarbon diluent at room temperature. After stirring for 18 hours, 23 mls of a 25 percent by weight solution of diethyl aluminum chloride was added and the flask was stirred for a further 6 hours. No cooling was applied to the mixture during this treatment. The catalyst was obtained in the form of a fine dispersion.

EXAMPLE 7

Dispersion using an ethylene/propylene copolymer

To a five liter autoclave maintained under nitrogen at 60°C was added three liters of the same hydrocarbon diluent as used in the previous examples. The autoclave was then vacuum purged to de-gas the diluent and an atmosphere of nitrogen re-established in the autoclave. To the diluent was added 60 m moles of diethyl aluminum chloride as a 25 percent by weight solution in the hydrocarbon diluent. Liquid propylene was then introduced into the autoclave until the pressure was 42 p.s.i.g. The propylene feed was stopped and ethylene was then fed into the autoclave until the total pressure in the autoclave had risen to 60 p.s.i.g.

30 m moles of titanium trichloride (as described in Examples 1 to 5) were charged to the autoclave under pressure and the ethylene feed was stopped. After two minutes the ethylene feed was restarted at a rate of 258 gms/hour, which was continued for 7 minutes before the ethylene feed was stopped. 110 mls of liquid propylene were charged to the autoclave followed by one liter of the hydrocarbon diluent. Two minutes later the ethylene feed was restarted at a rate of 258 gms/hours and after 5 minutes the flow rate was reduced to 201 gms/hour for a further 5 minutes. The feed was then discontinued and the autoclave was slowly vented and then purged with nitrogen.

As a result of this treatment the catalyst was broken down to give a fine dispersion. The catalyst dispersion was placed in a flask for storage, cooled and treated with the further 60 m moles of diethyl aluminum chloride before being used for polymerization

EXAMPLE 8

Dispersion of an aluminum reduced $TiCl_4$ component

A dispersed catalyst was obtained using as the titanium trichloride component a material obtained by the reduction of titanium tetrachloride with aluminum and available commercially as Stauffer AA and Toho TAC 131 titanium trichloride.

The titanium trichloride was used as a 0.1 molar slurry in hydrocarbon diluent in the presence of aluminum diethyl chloride in molar ratio of titanium trichloride to aluminum compound of 1:2. The mixture was held at 60°C and hexene-1 was added in the proportion of 6 moles of hexene-1 per mole of titanium trichloride.

After 1½ hours dispersion was essentially complete with the majority of particles having a particle size of about 2 microns. The mixture was left overnight at room temperature and no change or settling out occurred.

EXAMPLE 9

Dispersion of a hydrogen reduced $TiCl_4$ component

A dispersed catalyst was obtained using as the titanium trichloride component a material obtained by the reduction of titanium tetrachloride with hydrogen available commercially as Stauffer HA titanium trichloride.

The procedure used was essentially as described in Example 8, except that aluminum triethyl was used instead of diethyl aluminum chloride, the mole ratio of aluminum triethyl to titanium trichloride being 0.25:1.

After 1 hour dispersion was essentially complete with the majority of particles having a particle size of about two microns. There was no change on allowing the dispersed catalyst to stand overnight.

EXAMPLE 10

Dispersion with Decene-1

The titanium trichloride used was of the type described in Examples 1 – 5.

To a slurry which was 0.1 molar with respect to the titanium trichloride and 0.4 molar with respect to aluminum diethyl chloride was added decene-1 in an amount equivalent to 4 moles of decene-1 for each mole of $TiCl_3$. No heating or cooling was applied to the slurry during the treatment with decene-1. A fine dispersion was obtained which did not settle overnight.

TABLE 2

| Example | Catalyst used | Pressure (kgm./cm.²) | Temperature (°C.) | Average dwell time (secs.) | Catalyst concentration (moles/l.) | Catalyst in gas (moles p.p.m.) | Ethylene conversion to polymer (percent) | M.F.I. | Stress exponent | Yield stress (p.s.i.) | Break stress (p.s.i.) | Density (gm./cc.) | Elongation to break (percent) | Conversion (moles polymer/ mole TiCl₃) |
|---|---|---|---|---|---|---|---|---|---|---|---|---|---|---|
| 11 | 6 | 1,600 | 200 | 95 | 0.0025 | 0.95 | 9.5 | 3.3 | 1.26 | 4,580 | 3,280 | 0.964 | 680 | 100,000 |
| 12 | 7 | 1,600 | 200 | 100 | 0.0025 | 1.9 | 10.5 | 3.9 | 1.29 | 4,220 | 3,420 | 0.960 | 960 | 54,000 |
| 13 | 8 | 2,000 | 200 | 70 | 0.005 | 2.1 | 8.5 | 1.5 | 1.25 | 4,170 | 3,680 | 0.957 | 1,280 | 40,000 |
| 14 | 9 | 2,000 | 200 | 100 | 0.01 | 3.3 | 10.0 | 0.6 | 1.48 | 4,070 | 4,700 | 0.956 | 1,130 | 30,000 |
| 15 | 10 | 2,000 | 200 | 70 | 0.0025 | 1.7 | 9.0 | 1.8 | 1.31 | 4,120 | 4,550 | 0.956 | 1,210 | 53,000 |

EXAMPLES 11–15

Ethylene polymerization

The dispersed catalysts of Examples 6 to 10 were diluted and used for the polymerization of ethylene as set out in Examples 1–5. The details of the polymerization and some properties of the polymer product are set out in Table 2. In Examples 11 and 12 the catalyst dispersions were diluted with iso-octane, whereas in Examples 13 to 15, the diluent used was the same hydrocarbon liquid as used for the catalyst dispersion process.

In Examples 11, 12, 13 and 15, the molar ratio of titanium trichloride to aluminum diethyl chloride was 1:4, which was achieved by adding a further quantity of activator to the dispersed catalyst during the diluent step, if necessary. In Example 14, the dispersed catalyst contained 0.25 moles of aluminum triethyl per mole of titanium trichloride, and to this was added sufficient diethyl aluminum chloride to give a molar ratio diethyl aluminum chloride to titanium trichloride of 3:1. The catalyst of Example 14 thus had a mixed activator system.

For comparison there are set out in Table 3 the properties of some commercially available polyethylenes.

TABLE 3

| Polymer | MFI | Stress exponent | Density (gm/cc) | Yield stress (p.s.i.) | Break stress (p.s.i.) | Elongation to break (%) | M₉₀/Mₙ |
|---|---|---|---|---|---|---|---|
| A | 4.1 | 1.43 | 0.963 | 4530 | 2770 | 120 | 7.95 |
| B | 0.3 | 1.84 | 0.954 | 4350 | 3800 | 690 | 5.92 |
| C | 0.8 | 1.65 | 0.960 | 4320 | 4500 | 930 | 7.16 |

Polymer A was one prepared using a conventional low pressure Ziegler process whilst polymers B and C were prepared using a chromium oxide catalyst.

It will be noted that the yield stresses and break stresses are generally similar in the three Tables, but that for polymers of a given M.F.I., the elongations with polymers according to the present invention are much greater.

A further series of experiments were carried out to disperse catalysts using different techniques.

EXAMPLE 16

A 0.1 molar slurry of the TiCl₃ component described in Examples 1 to 5 was treated with hexene-1 in the proportion of 6 moles of hexene-1 per mole of TiCl₃ and in the absence of added activator at 60°C.

After one hour dispersion of the catalyst had occurred to give a majority of particles of size about 2 microns. This indicates dispersion can be achieved in the absence of added activator.

EXAMPLE 17

To a 0.1 molar slurry of the TiCl₃ component described in Examples 1 to 5 was added trimethyl aluminum in an amount sufficient to give a ratio of titanium trichloride to aluminum trimethyl of 1:2.

This was then treated at 60°C with 6 moles of hexene-1 for each mole of titanium trichloride. Dispersion of the catalyst to a particle size of about one micron was complete after six minutes.

EXAMPLE 18

The titanium trichloride used in Example 8 was used in a process as described in Example 16. After 3½ hours dispersion had occurred to give a majority of particles of size 1 to 2 microns and some larger particles of size about 5 to 5 microns. Some of the original catalyst particles however had not been dispersed.

EXAMPLE 19

Into a 300 ml vessel provided with a stirrer were placed 5 m moles of the titanium trichloride of Examples 1 – 5 and 10 m moles of diethyl aluminum chloride in a total volume of 57.4 mls of hydrocarbon diluent. The mixture was maintained at 80°C and 30 m moles of butene-1 were added.

Dispersion occurred to give particles of size about one micron with a few larger particles of about 5 microns. No separation of the slurry occurred overnight.

We claim:

1. In a process for the polymerization of ethylene within ethylene is polymerized in a main polymerization zone at a temperature not less than 125°C and a pressure not less than 500 atmospheres using a Ziegler type catalyst which is a combination of an organo-aluminum activator and a trivalent titanium component, the improvement which comprises using said trivalent titanium component either alone or together with added organo-aluminum activator, to polymerize in a preliminary zone separate from said main polymerization zone, a minor amount of at least one olefine monomer utilizing, when said olefine monomer is ethylene, pressure conditions which are substantially lower than used in said main polymerization zone, in the presence of a polymerization diluent under conditions such that the polymer thus formed is swollen by the diluent and causes fracturing of the catalyst particles whereby the trivalent titanium compound is finely dispersed and feeding said dispersed trivalent titanium compound together with organo-aluminum activator to said main polymerization zone.

2. The process of claim 1 wherein ethylene is polymerized at 140° to 300°C and a pressure of 1000 to 3000 atmospheres.

3. The process of claim 1 wherein ethylene is polymerized under conditions of temperature and pressure to give a single fluid phase.

4. The process of claim 1 wherein ethylene is polymerized at 160° to 260°C and at a pressure of at least 1400 atmospheres.

5. The process of claim 1 wherein ethylene is polymerized in the presence of a chain transfer agent.

6. The process of claim 1 wherein the trivalent titanium component is a titanium trihalide prepared by the reduction of titanium tetrachloride with hydrogen, aluminum or an organo-aluminum compound.

7. The process of claim 1 wherein the trivalent titanium component is dispersed by using it, together with an organo-aluminum activator, as a catalyst for the polymerization of an unbranched $\alpha$-olefine containing at least 5 carbon atoms.

8. The process of claim 1 wherein the trivalent titanium component is dispersed by using it, together with an organo-aluminum activator, as a catalyst for the polymerization of ethylene, propylene or butene-1 at a temperature of at least 60°C.

9. The process of claim 1 wherein the trivalent titanium component is dispersed by using it, together with an organo-aluminum activator, as a catalyst for the copolymerization of a mixture of $\alpha$-olefines to give an amorphous copolymer in which the monomer constituents are randomly distributed within the monomer chain.

10. The process of claim 1 wherein the trivalent titanium component is dispersed by using it, in the substantial absence of added organo-aluminum activator, as a catalyst for the polymerization of an $\alpha$-olefine of 2 to 16 carbon atoms.

11. The process of claim 6 wherein the trivalent titanium component is titanium trichloride prepared by the reduction of titanium tetrachloride with an organo-aluminum compound, which titanium trichloride has been dispersed by using it together with an organo-aluminum activator as a catalyst for the polymerization of an unbranched $\alpha$-olefine containing at least 5 carbon atoms.

12. The process of claim 1 wherein the polymerization conditions are such that ethylene is polymerized in an amount of at least 40,000 moles of ethylene per mole of trivalent titanium compound.

* * * * *